(12) United States Patent
Wang

(10) Patent No.: US 7,600,190 B2
(45) Date of Patent: Oct. 6, 2009

(54) WINDOW SWITCHING METHOD AND SYSTEM

(75) Inventor: Huai-Cheng Wang, Taoyuan (TW)

(73) Assignee: Mitac Technology Corp., Hsinchu (TW)

( * ) Notice: Subject to any disclaimer, the term of this patent is extended or adjusted under 35 U.S.C. 154(b) by 286 days.

(21) Appl. No.: 11/337,132

(22) Filed: Jan. 19, 2006

(65) Prior Publication Data

US 2007/0113196 A1    May 17, 2007

(30) Foreign Application Priority Data

Nov. 15, 2005    (TW) .............................. 94140044 A

(51) Int. Cl.
*G06F 3/048* (2006.01)
(52) U.S. Cl. ........................ 715/783; 715/767; 715/778; 715/779; 715/797; 715/838
(58) Field of Classification Search ................ 715/783, 715/764, 767, 776, 777, 778, 779, 781, 782, 715/788, 798, 799, 800, 801, 815, 838, 797 715/802, 803
See application file for complete search history.

(56) References Cited

U.S. PATENT DOCUMENTS

| 5,757,371 | A  | * | 5/1998  | Oran et al. ................. 715/779 |
| 6,710,788 | B1 | * | 3/2004  | Freach et al. .............. 715/778 |
| 6,750,888 | B1 | * | 6/2004  | Nakagawa ................... 715/800 |
| 2001/0028368 | A1 | * | 10/2001 | Swartz et al. ............... 345/835 |
| 2001/0035882 | A1 | * | 11/2001 | Stoakley et al. ............. 345/779 |
| 2003/0117440 | A1 | * | 6/2003  | Hellyar et al. .............. 345/767 |
| 2004/0085328 | A1 | * | 5/2004  | Maruyama et al. .......... 345/619 |
| 2004/0261038 | A1 |   | 12/2004 | Ording et al. |
| 2005/0022138 | A1 | * | 1/2005  | Tunney ....................... 715/827 |
| 2006/0123353 | A1 | * | 6/2006  | Matthews et al. ........... 715/779 |
| 2006/0161847 | A1 | * | 7/2006  | Holecek et al. ............. 715/716 |
| 2006/0224991 | A1 | * | 10/2006 | Stabb et al. ................. 715/781 |
| 2006/0242602 | A1 | * | 10/2006 | Schechter et al. ........... 715/838 |
| 2006/0248471 | A1 | * | 11/2006 | Lindsay et al. .............. 715/800 |
| 2007/0288860 | A1 | * | 12/2007 | Ording et al. ................ 715/779 |

\* cited by examiner

*Primary Examiner*—Weilun Lo
*Assistant Examiner*—Rashedul Hassan
(74) *Attorney, Agent, or Firm*—Quintero Law Office

(57) ABSTRACT

A window switching method. A window list is automatically adjusted according a lower limit to the sizes of program symbols on the window list, thus preventing the symbols on the window list from unlimited shrinkage due to an increased number of runtime program windows.

12 Claims, 5 Drawing Sheets

WINDOW SWITCHING METHOD AND SYSTEM

BACKGROUND OF THE INVENTION

1. Field of the Invention

The present invention relates to computer techniques, and more particularly to window switching methods.

2. Description of the Related Art

A multi-tasking operating system (OS) can simultaneously open multiple application windows where one of them known as the focused window is selected to receive user operations.

In a Microsoft Windows™ operating system, the toolbar is utilized to switch windows. As more windows are opened, toolbar buttons shrink smaller, even until text and icons thereon become imperceptible.

In a Macintosh™ operating system, a list of window snapshots can be shown on a display using hot keys. Windows are switched by changing the focus on the list. As one could expect, when more windows are opened, window snapshots shrink much smaller, even to imperceptible scales.

BRIEF SUMMARY OF THE INVENTION

An exemplary embodiment of a window switching method is implemented in a computer system comprising a display and a window list displayed thereon. The window list comprises a symbol for a first program. When the computer system initiates a second program with a window thereof displayed on the display, a symbol for the second program is allocated in the window list. The sizes of the symbols for the first program and the second program are averagely adjusted. Whether the size of the symbol for the second program is smaller than a predetermined size is determined. If so, the window list and the symbol for the second program are automatically adjusted to make the sizes of the symbols for the first program and the second program respectively larger than the predetermined size. When a symbol on the list is selected, a window of a program corresponding to the selected symbol is assigned as a focused window of the computer system.

An exemplary embodiment of a window switching system comprises a display, a window list, a list manager, and an operating system. The window list is displayable on the display and comprises a symbol for a first program. The list manager allocates a symbol for a second program in the window list when the second program is initiated and a window thereof is displayed on the display. The list manager averagely adjusts the sizes of the symbols for the first program and the second program, and determines if the size of the symbol for the second program is smaller than a predetermined size. If so, the list manager automatically adjusts the window list and the symbol for the second to make the sizes of the symbols for the first program and the second program respectively larger than the predetermined size. When a symbol on the list is selected, the operating system assigns a window of a program corresponding to the selected symbol to be a focused window.

An exemplary embodiment of a window switching method is implemented in a computer system comprising a display and a window list to be displayed thereon. The window list comprises a symbol for a first program. A setting of a predetermined size is retrieved. When the computer system initiates a second program with a window thereof displayed on the display, a symbol for the second program is allocated in the window list. The window list and the symbol for the second program are automatically adjusted to make the size of the symbol for the second program larger than the predetermined size. When a symbol on the list is selected, a window of a program corresponding to the selected symbol is assigned as a focused window of the computer system.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
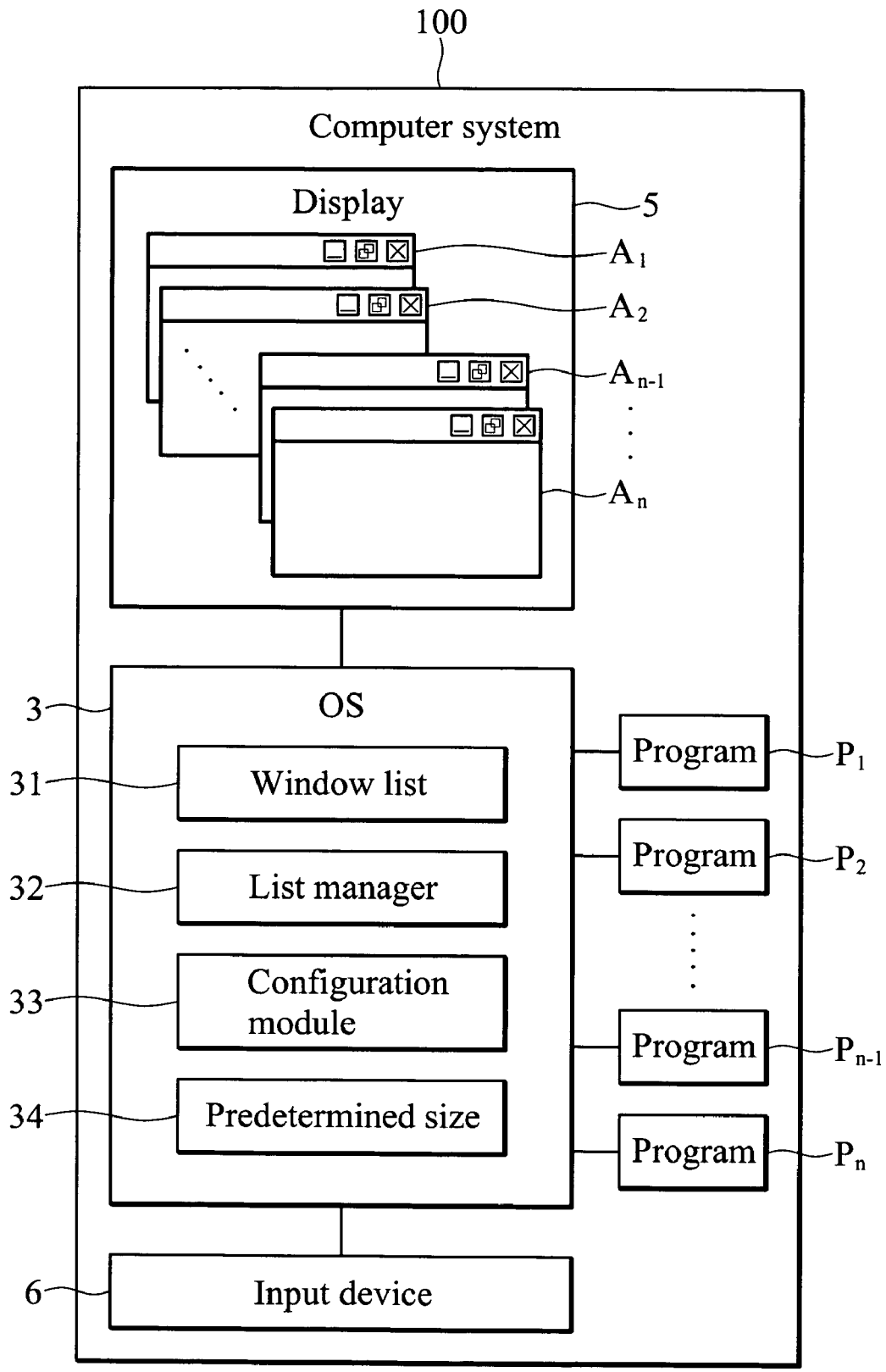
FIG. 1 is block diagram of an exemplary embodiment of a computer system.

Computer system 100 in FIG. 1 comprises operating system (OS) 3, display 5, and input device 6. In OS 3, list manager 32 configures window list 31. For each program, list manager 32 allocates a symbol thereof in window list 31 when the program is initiated by OS 3. Window list 31 displayable on display 5 may initially have a fixed size not larger than display 5 when there are few runtime applications are not so many.

A symbol of a program may comprise a static or dynamic snapshot of a window of the program. The dynamic snapshot is altered (such as changing appearance) with the status of the executed application. When a symbol on window list 31 is selected in response to a control signal from input/output device 6, OS 3 assigns a window of a program corresponding to the selected symbol to be a focused window, i.e. the most upper window on the desktop of OS 3. List manager 32 may averagely allocate the space for symbols on window list 31, such that each symbol is the same size. An example of window list 31 comprises a Windows™ toolbar.

Input device 6 may comprise a keyboard, a mouse, a touch panel, or another input device from which configuration module 33 receives settings. Modules of OS 3 may be implemented by computer programs executed by a processor (not shown) of computer system 100 to perform a window switching method. List manager 32 and configuration module 33 may be packed as a software package to be installed on computer system 100. List manager 32 and configuration module 33 may work as a memory resident program which is executed each time when computer system 100 boots. Alternatively, list manager 32 and configuration module 33 may be triggered utilizing input device 6. For example, the installed list manager 32 and configuration module 33 can be initiated utilizing a function key or a key combination. Before executing these modules, computer system 100 works based on the default window list management scheme of OS 3 (such as Microsoft Windows™). After these modules have been initiated, the following window switching method is in charge of window management, and the way in which input device 6 is operated is accordingly changed for the convenience of controlling window list 31, as described in the following.

Figure 2:
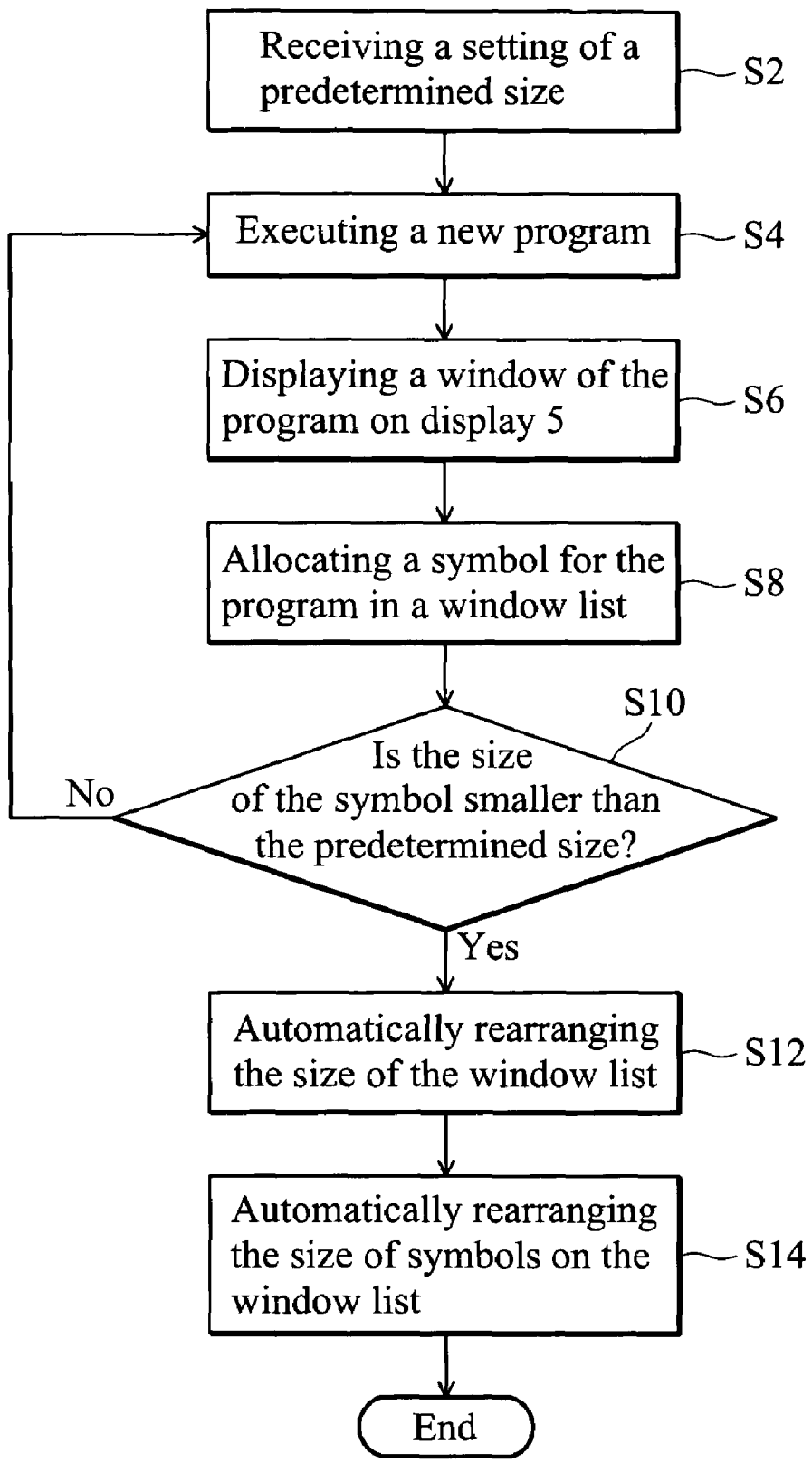
FIG. 2 is a flowchart of an exemplary embodiment of a window switching method.

With reference to FIG. 2, computer system 100 executes a window switching method.

First, configuration module 33 receives a setting of predetermined size 34 defining the smallest size of program symbol on window list 31 (step S2). As computer system 100 executes programs $P_1, P_2, \ldots$ and $P_{n-1}$, OS 3 displays windows $A_1, A_2, \ldots$ and $A_{n-1}$ corresponding thereto on the main portion of display 5. Programs $P_1, P_2, \ldots$ and $P_{n-1}$ may comprise applications.

Figure 3:
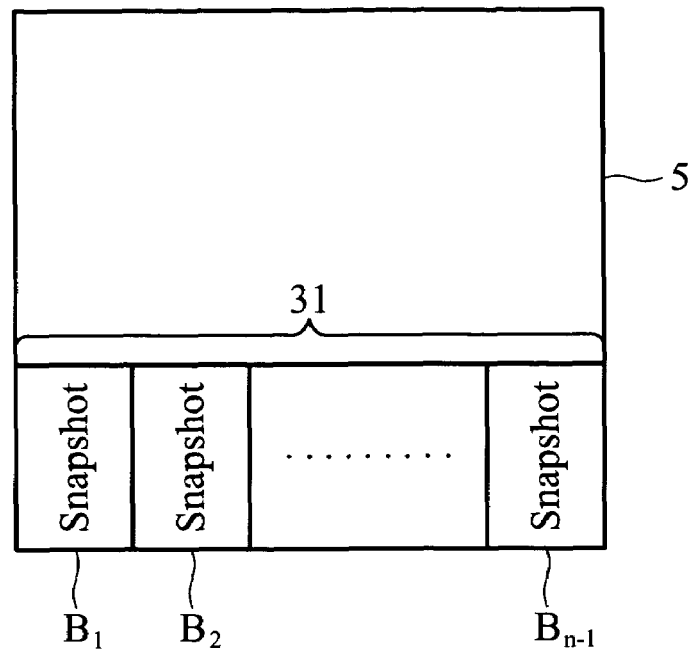
FIG. 3 is a schematic view showing an exemplary embodiment of the configuration of a window list.
Figure 4:
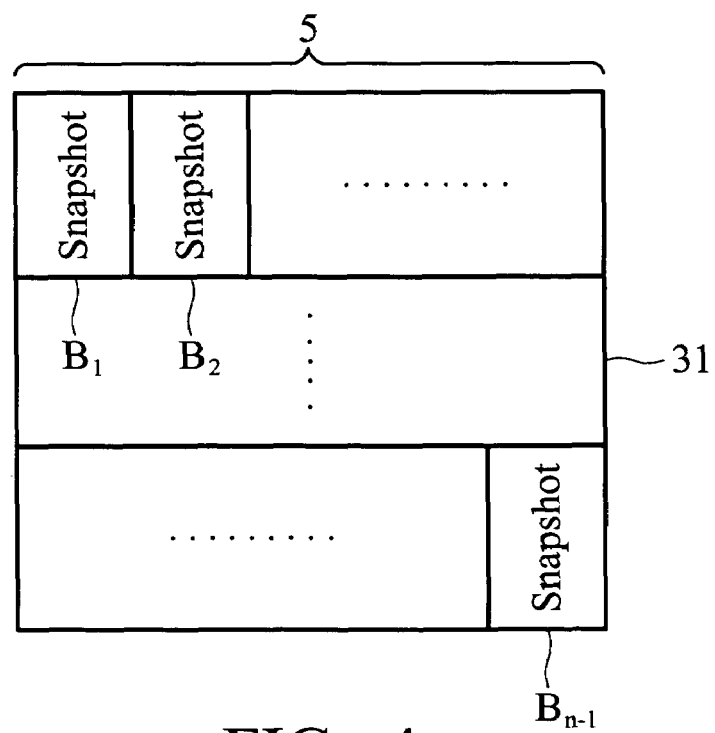
FIG. 4 is a schematic view showing another exemplary embodiment of the configuration of the window list.

FIGS. 3 and 4 respectively show different examples of window list 31. In FIGS. 3 and 4, symbols $B_1, B_2, \ldots$ and $B_{n-1}$ are respectively snapshots of windows $A_1, A_2, \ldots$ and $A_{n-1}$, corresponding to programs $P_1, P_2, \ldots$ and $P_{n-1}$. Window list 31 is limited to the fixed size not exceeding the observable range of the main portion of display 5. In FIG. 3, symbols $B_1, B_2, \ldots$ and $B_{n-1}$ are arranged in a line. In FIG. 4, symbols $B_1, B_2, \ldots$ and $B_{n-1}$ occupy the full screen of display 5.

When computer system 100 begins to execute program $P_n$ (step S4), OS 3 displays window $A_n$ of the program on display 5 (step S6). List manager 32 allocates a symbol (such as a snapshot) for program $P_n$ in window list 31 (step S8).

In step S8, list manager 32 may averagely allocate the sizes of symbols $B_1, B_2, \ldots$ and $B_n$ and determine if the size of the symbol for program $P_n$ is smaller than predetermined size 34 (step S10).

If not, step S4 is repeated when another program is initiated. If so, list manager 32 automatically rearranges window list 31 and the symbol for program $P_n$ (steps S12 and S14) to make the size of the symbol for program $P_n$ larger than or equal to the predetermined size 34. After having been averagely rearranged by list manager 32, each window snapshot is larger than predetermined size 34.

In step S12, when symbol $B_n$ of program $P_n$ is smaller than predetermined size 34, list manager 32 automatically enlarges window list 31 and rearrange the sizes of snapshots in window list 31 in step S14. For example, list manager 32 averagely allocates snapshots on window list 31.

Figure 5:
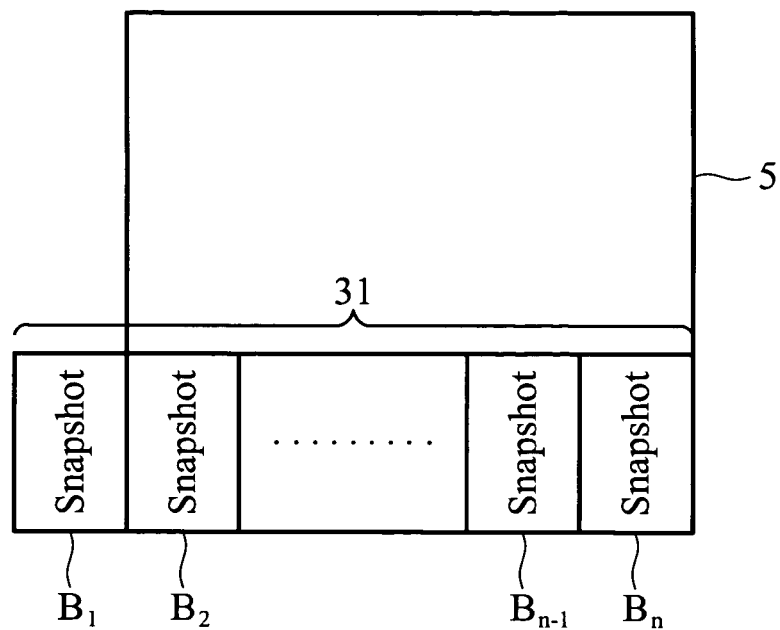
FIG. 5 is a schematic view showing an exemplary embodiment of the configuration of the rearranged window list.

With reference to the example in FIG. 3, after having been rearranged, window list 31 exceeds the border of display 5, as shown in FIG. 5. Symbol $B_n$ comprises a snapshot of window $A_n$ corresponding to program $P_n$. List manager 32 may move window list 31 according to signals from input device 6 of computer system 100.

Figure 6:
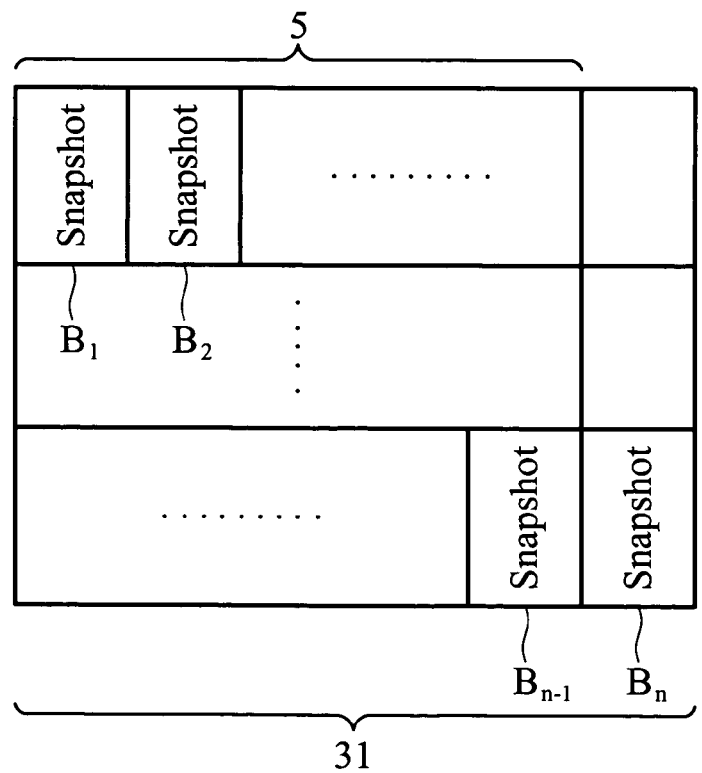
FIG. 6 is a schematic view showing another exemplary embodiment of the configuration of the rearranged window list.

With the example in FIG. 4, after having been rearranged, window list 31 exceeds the border of display 5, as shown in FIG. 6. Symbol $B_n$ comprises a snapshot of window $A_n$ corresponding to program $P_n$. List manager 32 may move window list 31 according to signals from input device 6 of computer system 100.

As described, input device 6 provides a first operation mode and a second operation mode. Upon initiation of list manager 32 or display of window list 31, input device 6 may be converted from the first operation mode to the second operation mode. While window list 31 exceeds the observable range of display 5 after being rearranged, input device 6 provides signals for moving window list 31 and selecting a program symbol therefrom. For example, direction keys or a mouse of computer system 100 are utilized to move a cursor on display 5 in the first operation mode, and are utilized to move window list 31 and select a program symbol in the second operation mode.

Figure 7:
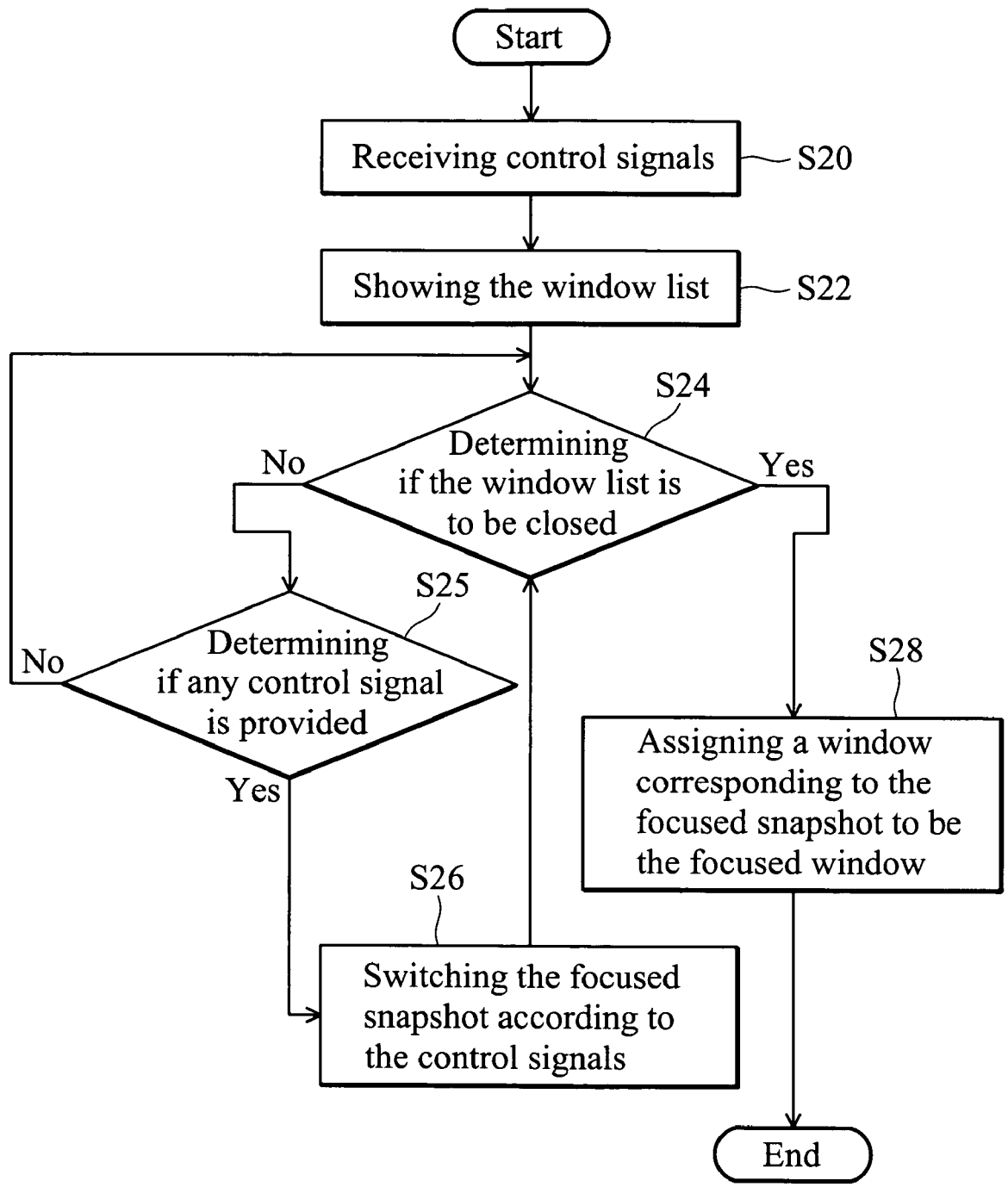
FIG. 7 is a flowchart of a window switching process.

With reference to FIG. 7, OS 3 receives control signals from input device 6 (step S20) to show window list 31 (step S22). OS 3 determines if window list 31 is to be closed (step S24). If not, OS 3 determines if input device 6 provides control signals for selecting a focused snapshot from window list 31 (step S25), which can be distinguished by a frame. If not, step S24 is repeated. If so, OS 3 switches the focused snapshot of window list 31 according to the control signals (step S26). When window list 31 is closed, OS 3 sets a window (such as program $P_n$) corresponding to the focused snapshot (such as snapshot $B_n$) to be the focused window (step S28).

For example, the focused snapshot is labeled by a frame in the midst of display 5. Input device 6 is operated to continuously and smoothly move window list 31, thus changing relative positions of window list 31 and the frame. When window list 31 is closed, OS 3 sets a window corresponding to the snapshot in the center of display 5 to be the focused window.

Thus, snapshots on a window list are kept larger than the predetermined size and prevented from unlimited shrinkage. The size of a window list is adjusted, even to exceed a display size when too many windows are opened, and the enlarged window list is controlled via an input device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A window switching method implemented on a computer system comprising a display and an input device, the method comprising:

displaying a windows list comprising a plurality of non-overlapping window snapshots on the display, each window snapshot corresponding to one of a plurality of programs being executed on the computer system, wherein the size of each window snapshot is automatically adjusted to be at least a predetermined minimum size and wherein the window snapshots are adjusted in size to fill the entire observable screen area of the display each time an additional window snapshot gets automatically added to the list in response to an additional corresponding program being executed, wherein a combined size of the window snapshots defines a size of the windows list, and when the size of the windows list exceeds the entire observable screen area of the display with each window snapshot adjusted to the predetermined minimum size, only a first portion of the windows list comprising a first subset of the window snapshots fills the entire observable screen area of the display, and a second portion of the windows list comprising a second subset of the window snapshots is not displayed in the display screen;

making a program window corresponding to a selected snapshot to be the focused window of the display in response to a selection signal from the input device.

2. The method of claim 1, wherein the size of each window snapshot is adjusted to be equal in size.

3. The method of claim 2, wherein the windows snapshots are arranged in a grid.

4. The method of claim 1, further comprising the step of moving the windows list such that at least one window snapshot in the second subset is displayed in the observable range in response to a move signal from an input device of the computer system.

5. The method of claim 4, wherein at least one window snapshot in the first subset is removed from the observable range when the at least one window snapshot in the second subset is displayed in the observable range.

6. The method of claim 5, wherein the windows list is displayed in response to a display signal from the input device.

7. A computer system comprising:

a display;

an input device;

a list manager configured to display a windows list comprising a plurality of non-overlapping window snapshots on the display, each window snapshot corresponding to one of a plurality of programs being executed on the computer system, the list manager configured to adjust the size of each window snapshot to be at least a predetermined minimum size and wherein the window snapshots are adjusted in size to fill the entire observable screen area of the display each time an additional window snapshot gets automatically added to the list in response to an additional corresponding program being executed, wherein a combined size of the window snapshots defines a size of the windows list, and when the size of the windows list exceeds the entire observable screen area of the display with each window snapshot adjusted to the predetermined minimum size, only a first portion of the windows list comprising a first subset of the window snapshots fills the entire observable screen area of the display, and a second portion of the windows list comprising a second subset of the window snapshots is not displayed in the display screen;

an operating system configured to receive a selection signal from the input device and make a program window corresponding to a selected snapshot to be the focused window of the display in response to the selection signal.

8. The computer system of claim 7, wherein the list manager is configured to adjust the size of each window snapshot to be equal in size.

9. The computer system of claim 8, wherein the list manager is configured to arrange the windows snapshots in a grid.

10. The computer system of claim 7, wherein the list manager is configured to move the windows list such that at least one window snapshot in the second subset is displayed in the observable range in response to a move signal from an input device of the computer system.

11. The computer system of claim 10, wherein the list manager is configured to remove at least one window snapshot in the first subset from the observable range when the at least one window snapshot in the second subset is displayed in the observable range.

12. The computer system of claim 7, wherein the list manager is a module of the operating system.

* * * * *